US010013638B2

(12) United States Patent
Zhang et al.

(10) Patent No.: US 10,013,638 B2
(45) Date of Patent: Jul. 3, 2018

(54) CANCER DIAGNOSTIC METHOD AND SYSTEM

(76) Inventors: Ping Zhang, Robina (AU); Kuldeep Kumar, Robina (AU)

( * ) Notice: Subject to any disclaimer, the term of this patent is extended or adjusted under 35 U.S.C. 154(b) by 803 days.

(21) Appl. No.: 12/540,779

(22) Filed: Aug. 13, 2009

(65) Prior Publication Data

US 2010/0119128 A1 May 13, 2010

Related U.S. Application Data (60) Provisional application No. 61/089,016, filed on Aug. 14, 2008.

(51) Int. Cl.
G06K 9/00 (2006.01)
G06K 9/62 (2006.01)

(52) U.S. Cl.
CPC ......... *G06K 9/6229* (2013.01); *G06K 9/6292* (2013.01); *G06K 2209/05* (2013.01)

(58) Field of Classification Search
USPC .... 382/128, 131–133; 250/363.04, 582–584; 378/4, 21, 37; 435/6.14, 7.2
See application file for complete search history.

(56) References Cited

U.S. PATENT DOCUMENTS 5,260,871 A * 11/1993 Goldberg ................. 600/320
5,627,907 A * 5/1997 Gur et al. .................. 382/132
5,825,936 A * 10/1998 Clarke et al. .............. 382/261
6,138,045 A * 10/2000 Kupinski et al. ........... 600/425
6,198,838 B1 * 3/2001 Roehrig et al. ............. 382/132
6,263,092 B1 7/2001 Roehrig et al.
6,282,305 B1 * 8/2001 Huo et al. .................. 382/128
6,640,001 B2 10/2003 Roehrig et al.
7,203,350 B2 4/2007 Leichter et al.
7,646,904 B2 * 1/2010 Summers et al. .......... 382/128
2002/0003894 A1 1/2002 Roehrig et al.
2003/0006770 A1 * 1/2003 Smith ........................ 324/309
2004/0086158 A1 5/2004 Leichter et al.
2006/0018524 A1 * 1/2006 Suzuki et al. .............. 382/128
2006/0280348 A1 * 12/2006 Smith et al. ................ 382/128

(Continued)

FOREIGN PATENT DOCUMENTS

WO    WO 00/13134 A1    3/2000
WO    WO 02/15113 A2    2/2002

(Continued)

OTHER PUBLICATIONS

Chou et al ("Mining the breast cancer pattern using artificail neural networks and multivariate adaptive regeression splines", Elsevier, Expert systems with Applciations 2004.*

(Continued)

*Primary Examiner* — Shervin Nakhjavan
(74) *Attorney, Agent, or Firm* — Martin IP Pty Ltd (57) ABSTRACT

A method and system for classifying tissue suspected of being abnormal as being malignant or benign. The method includes generating a set of selection features, performing statistical applications to generate additional selection features, generating a feature vector for the abnormal tissue, feeding the feature vector into a neural network, and obtaining a result from the neural network as to whether the abnormal tissue is malignant or benign. The method and system may be used for determining the presence of breast cancer.

14 Claims, 1 Drawing Sheet

(56) References Cited

U.S. PATENT DOCUMENTS

2007/0019854 A1* 1/2007 Gholap et al. ............... 382/133
2007/0099219 A1* 5/2007 Teverovskiy et al. ............ 435/6
2009/0048876 A1* 2/2009 Bonissone et al. ............... 705/4

FOREIGN PATENT DOCUMENTS

| WO | WO 03/009209 A1 | 1/2003 |
| WO | WO 03/027955 A1 | 4/2003 |
| WO | WO 03/087983 A2 | 10/2003 |
| WO | WO 2004/012145 A2 | 2/2004 |
| WO | WO 2004/029851 A1 | 4/2004 |
| WO | WO 2005/001742 A2 | 1/2005 |

OTHER PUBLICATIONS

Hassanien et al., "Rough Neural Intelligent Approach for Image Classification: A Case of Patients with Suspected Breast Cancer," *International Journal of Hybrid Intelligent Systems* 3(4): 205-218 (Dec. 2006).

Kumar et al., "Application of Decision Trees for Mass Classification in Mammography," The $2^{nd}$ *International Conference on Natural Computation and the $3^{rd}$ International Conference on Fuzzy Systems and Knowledge Discovery*, 366-376 (Sep. 2006).

*MARS User Guide*, (Salford Systems, San Diego, CA, 2001) 1-2, 17-28.

Raudys, "Chapter 5: Integration of Statistical and Neural Approaches," *Statistical and Neural Classifiers, An Integrated Approach to Design*, (Springer-Verlag, London, 2001) 191-195.

Verma et al., "A Hybrid Approach Based on Genetic Algorithms in Conjunction with Statistical Methods for the Diagnosis of Breast Cancer," *Advanced Computational Methods for Biocomputing and Bioimaging*, (Nova Science Publishers, New York, NY) Pham et al, Eds, 167-188 (2007).

Verma et al., "A Novel Neural-Genetic Algorithm to Find the Most Significant Combination of Features in Digital Mammograms," *Applied Soft Computing*, 7(2): 612-625 (Mar. 2007).

Zhang et al., "Neural Vs. Statistical Classifier in Conjunction with Genetic Algorithm Feature Selection in Digital Mammography," *Proceedings of the 2003 Congress on Evolutionary Computation*, 2: 1206-1213, (Canberra, Australia, Dec. 8-12, 2003).

Zhang et al., "A Neural-Genetic Algorithm for Feature Selection and Breast Abnormality Classification in Digital Mammography," *Proceedings of the 2004 IEEE International Joint Conference on Neural Networks*, 3: 2303-2308 (Budapest, Hungary, Jul. 25-29, 2004).

Zhang et al., "A Hybrid Classifier for Mass Classification with Different Kinds of Features in Mammography," *Fuzzy Systems and Knowledge Discovery, Second International Conference, FSKD 2005*, 316-319 (Germany, 2005).

Zhang et al., "Neural vs. Statistical Classifier in Conjunction with Genetic Algorithm Based Feature Selection," *Pattern Recognition Letters*, 26(7): 909-919 (May 15, 2005).

Zhang et al., "Analyzing Feature Significance from Various Systems for Mass Diagnosis," *International Conference on Computational Intelligence for Modelling Control and Automation and International Conference on Intelligent Agents, Web Technologies and Internet Commerce*, 1-6 (2006).

\* cited by examiner

CANCER DIAGNOSTIC METHOD AND SYSTEM

CROSS REFERENCE TO RELATED APPLICATIONS

This application claims the benefit of U.S. Provisional Application No. 61/089,016, filed Aug. 14, 2008, entitled "Cancer Diagnostic Method and System," the entire contents of which is incorporated by reference herein.

FIELD OF THE INVENTION

The present invention relates to improvements in methods and systems for determining whether an abnormal growth is malignant or benign.

BACKGROUND OF THE INVENTION

Breast cancer is the second leading cause of cancer death for all women in the world and the most common cause of death from cancer in Australian women. Early detection is the key to successful treatment and reduction of mortality. Mammography is a widely accepted way for breast cancer early detection. However, there are still 10%-30% of women who have breast cancer and undergo mammography have negative mammograms.

A computer aided diagnosis ("CAD") system can serve as the second reader to aid radiologists in breast cancer detection and diagnosis saving both cost and time. Current image processing techniques make breast abnormality detection easier, however classification of malignant and benign cancers is still a very challenging and a difficult problem for researchers. The key factors affecting the classification results are feature extraction and classification techniques.

Abnormal findings in breast cancer are typically manifested by calcifications and/or masses. Microcalcification is a tiny calcium deposit that has accumulated in the breast tissue, which is an early signature for discriminating between normal and cancerous tissues, and it appears as a small bright spot on the mammogram. Masses can also be an indicator of breast cancer.

The CAD system generally consists of image acquisition, image pre-processing, area segmentation, and feature extraction, followed by classification. Suspicious areas can be located using various techniques, and different classification methods can be used for further breast abnormality classification. The classification is usually based on the features extracted from the suspicious areas. Over the years, researchers have developed many different methods and computer algorithms to improve CAD effectiveness. However, previous researchers have not yet produced a stable and accurate system, and classification of malignant and benign cancers is still a very challenging problem for researchers. Accordingly, there exists a need to provide an improved system and method able to provide results that are better than prior known methods and systems.

The reference to any prior art in this specification is not, and should not be taken as an acknowledgement or any form of suggestion that the referenced prior art forms part of the common general knowledge in Australia.

SUMMARY

The present invention in one preferred aspect provides for a method for classifying an abnormality as being malignant or benign, comprising: generating a set of selection features relating to data obtained about a subject which has the abnormality; performing at least three different statistical applications using the set of selection features to generate further selection features; using the further selection features in combination with the set of selection features to generate a feature vector for the abnormality; feeding the feature vector into a neural network; and obtaining a result from the neural network as to whether the abnormality is malignant or benign.

In another preferred aspect, the present invention provides for a method for classifying an abnormality as being malignant or benign, comprising: generating a set of selection features relating to data obtained about a subject which has the abnormality; performing a statistical application utilising multivariate adaptive regression splines with the set of selection features to generate at least one further selection feature; using the at least one further selection feature in combination with the set of selection features to generate a feature vector for the abnormality; feeding the feature vector into a neural network; and obtaining a result from the neural network as to whether the abnormality is malignant or benign.

In a further preferred aspect, the present invention provides a method for classifying an abnormality as being malignant or benign, comprising: generating a set of selection features relating to data obtained about a subject which has the abnormality; performing a statistical application utilising support vector machine with the set of selection features to generate at least one further selection feature; using the at least one further selection feature in combination with the set of selection features to generate a feature vector for the abnormality; feeding the feature vector into a neural network; and obtaining a result from the neural network as to whether the abnormality is malignant or benign.

In another preferred aspect, the present invention provides a system for classifying an abnormality as being malignant or benign, comprising: at least one input for receiving a set of selection features relating to information about a subject which has the abnormality; at least one processor coupled to the input, the processor configured to generate further selection features from at least three statistical calculations performed on the set of selection features; and a neural network adapted to determine whether the abnormality is malignant or benign utilising the set of selection features and the further selection features.

DETAILED DESCRIPTION OF THE DRAWINGS

Alternative embodiments of the invention will be apparent to those skilled in the art from consideration of the specification and practice of the invention disclosed herein. It is intended that the specification and examples be considered as exemplary only, with a true scope and spirit of the invention being indicated by the claims which follow.

Figure 1:
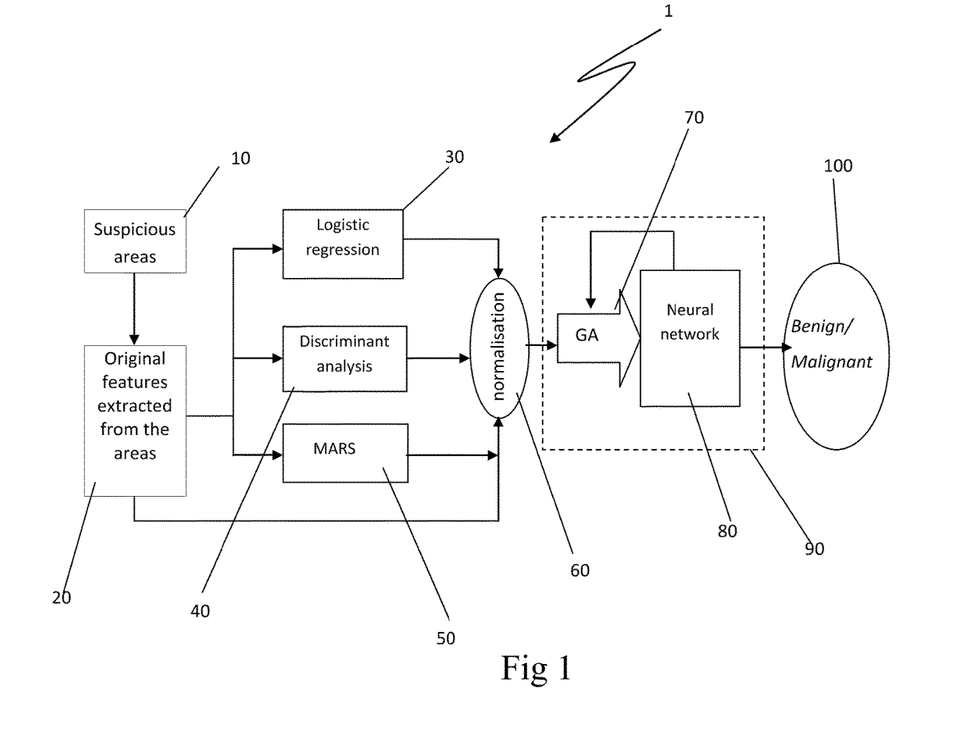
FIG. 1 is a flow diagram of a method for diagnosing cancer in accordance with a preferred embodiment of the present invention.

FIG. 1 shows a flow diagram of a method and system for diagnosing breast cancer in accordance with one preferred embodiment of the present invention. It will be appreciated that although the preferred embodiment is described in relation to diagnosing breast cancer, the invention has broader applications as will be further described below. In brief, images from suspicious areas are extracted to produce a set of original selection features, some of which include human interpreted features and some of which include computer extracted features. The set of selection features is used as independent variables for logistic regression classification; discriminant analysis classification; and multivariant adaptive regression splines classification. Feature vectors are created for every suspicious area using the set of original features in combination with the outputs of each statistical classification. The features are normalised before the feature file is fed to a neural network. The neural network is fed the normalised feature file for further classification in conjunction with genetic algorithm for feature selection to produce a result of "benign" or "malignant." The preferred components of the method and system are described in further detail below.

Referring to FIG. 1, a scan is performed on an individual subject to obtain data. Typically such data will be in the form of one or more images. Suspicious areas are identified in the images (box 10). The identification may be by way of human interpretation and/or computer identification. The suspicious areas are segmented from the rest of the image features related to the suspicious areas. Segmentation may be achieved, for example only, using boundary-based techniques and/or region-based techniques. Other techniques may be used as desired, such as region growing, edge detection and wavelet based techniques.

Features are extracted for further classification (FIG. 1, box 20). Feature extraction involves extracting important features from the suspicious areas and/or boundary areas in the images, which are preferably digital images.

Examples of features include human interpreted features and computer-extracted features. Examples of human interpreted features include, but are not limited to patient age, density, calcification type/mass shape, calcification distribution/mass margin, assessment, subtlety and mass-association/calcification-association. Many of these features may involve numerical assignment for a set of characteristics within each feature type. For example, the following calcification types may each be assigned a number: punctuate, amorphous, pleomorphic, round and regular, lucent center, fine linear branching, skin calcification, vascular, coarse, large rodlike, round, egg shell, milk of calcification, dystrophic, and suture. The following mass shapes may each be assigned a number: round, oval, lobulated, irregular, architectural distortion, tubular, lymph node asymmetric breast tissue, and focal asymmetric density. Each of the following mass margins may be assigned a number: circumscribed, microlobulated, obscured, ill defined, and speculated. Each of the following assessments may be assigned a number: negative, benign finding—negative, probability benign finding—short interval follow-up suggested, suspicious abnormality—biopsy should be considered, and highly suggestive of malignancy. Subtlety is a subjective impression of the subtlety of a lesion by a skilled radiologist. The subtlety value for a lesion may indicate how difficult it is to find the lesion and may be given a numeric value between 1 ("subtle") and 5 ("obvious"). An additional feature for both calcification and mass cases is mass-association or calcification-association; Mass-association describes how a calcification case relates to a mass, and calcification-association is to describe how a mass relates to a calcification. This idea comes from the observation that some of the calcifications cases can also be present as a mass. Preferably there are seven human-interpreted features. It will be appreciated that more or less human-interpreted features may be used, and may be substituted with features other than those set forth above.

Computer-extracted features typically include the image processing features calculated based on the pixels and grey levels related to the extracted areas. Preferably, eighteen computer-extracted features are utilized and calculated. The name and the definition of the eighteen exemplary features are listed below:

For each of the formulae listed below:
T is the total number of pixels;
g is an index value of image I;
I(g) is the grey level value of pixel g in image I;
K is the total number of grey levels;
j is the grey level value;
N(j) is the number of pixels with grey level j in image I;
P(g) is the probability of grey level value I(g) occurring in image I, P(g)=N(I(g)/T; and
P(j) is the probability of grey level value j occurring in image I, P(j)=N(j)/T.

1) number of pixels represents how many pixels are included inside the suspicious area.
2) average histogram indicates the grey level distribution for the mammogram.

$$\text{Average Histogram} = \frac{1}{k}\sum_{j=0}^{T-1} N(j) \quad (1)$$

3) average grey level (AvgGrey) is the mean value of the grey levels in the suspicious area.

$$AvgGrey = \frac{1}{T}\sum_{g=0}^{T-1} I(g) \quad (2)$$

4) average boundary grey level (AvgGrey_Boundary) is the mean value of the grey levels in the extracted boundary areas.
5) difference gives an indication of the change of intensity across the boundary of the extracted area.

$$\text{Difference} = AvgGrey - AvgGry\_Boundary \quad (3)$$

6) contrast indicate sharpness of the grey level changing.

$$\text{Contrast} = \frac{\text{Difference}}{AvgGrey + AvgGrey\_Boundry} \quad (4)$$

7) energy is one of the measures of how grey levels are distributed.

$$\text{Energy} = \sum_{g=0}^{T-1} [P(I(g))]^2 \quad (5)$$

8) modified energy is modified based on energy formula.

$$\text{Modified Energy} = \sum_{g=0}^{T-1} [P(I(g))]^2 \quad (6)$$

9) entropy measures the non uniformity of the distribution.

$$\text{Entropy} = -\sum_{j=0}^{k-1} P(j)\log_2[P(j)] \quad (7)$$

10) modified entropy is modified based on the entropy calculation.

$$\text{Modified Entropy} = -\sum_{g=0}^{T-1} P(g)\log_2[P(I(g))] \quad (8)$$

11) standard deviation measures the spread of the data in the area.

$$\text{Standard Deviation } (\sigma) = \sqrt{\sum_{g=0}^{T-1} (j - AvgGrey)^2 \, P(j)} \quad (9)$$

12) modified standard deviation is modified based on the standard deviation calculation.

$$\text{Modified } stanDev \, (\sigma_m) = \sqrt{\sum_{g=0}^{T-1} (I(g) - AvgGrey)^2 \, P(I(g))} \quad (10)$$

13) skew is a measure of the asymmetry about the mean grey level.

$$\text{Skew} = \frac{1}{\sigma_j^3} \sum_{j=0}^{k-1} (j - AvgGrey)^3 P(j) \quad (11)$$

14) modified skew is modified from the traditional skew formula.

$$\text{Modified Skew} = \frac{1}{\sigma_g^3} \sum_{g=0}^{T-1} (I(g) - AvgGrey)^3 P(I(g)) \quad (12)$$

15) kurtosis measures the sharpness of grey level distribution.

$$\text{Kurtosis} = \frac{1}{\sigma_j^4} \sum_{j=0}^{k-1} (j - AvgGrey)^4 P(j) - 3 \quad (13)$$

16) maximum grey level is the biggest value of all the grey level values in the suspicious area.
17) minimum grey level is the smallest value of all the grey level values in the suspicious area.
18) perimeter is the number of pixels on the boundary of suspicious area.

Preferably, a set of 25 features related to the suspicious mass or calcification areas, including 18 computer extracted features and 7 human interpreted features are extracted for classification. It will be appreciated that varying combinations of features may be used without departing from the scope of the present invention. For example, more or less than 18 computer extracted features may be utilized. More or less than 7 human features may be utilized. The feature set may include only computer extracted features, or only human-interpreted features. The feature set may include any feature that could contribute to the diagnosis of the abnormality, for example, features from mediolateral oblique ("MLO") view mammograms.

Once a set of selection features has been generated, the set is preferably classified using a classifier. Classifiers are preferably used to distinguish between actual lesions and normal tissues, or between malignant and benign lesions. There are a variety of techniques suitable for use as a classifier. Suitable classifiers include, but at not limited to statistical applications (e.g., K-nearest neighbor, Bayesian classifiers, rank nearest neighbor, fuzzy pyramid linking, discriminant analysis, logistic regression, multivariant adaptive regression splines, support vector machine, and Hidden Markov Model), neural networks, decision trees, associated rule mining, and case-based reasoning, or a combination of any of the foregoing.

A hybrid system of classifiers provides excellent results. The idea of the hybrid system is from analyzing the advantages and weak points of the different classifiers. Experiments with different models have shown that feature extraction is important for the further mammography diagnosis of breast cancer. A preferred hybrid system, shown in FIG. 1, combines statistical applications with a neural network. In particular, a preferred hybrid system combines logistic regression, discriminant analysis, multivariant adaptive regression splines and a neural network for classification, and genetic algorithm for feature selection. These components are further described below.

Logistic regression ("LR") is useful for situations in which there is a desire to be able to predict the presence or absence of a characteristic or outcome based on values of a set of predictor variables.

The LR model for a binary dependent variable can be written as:

$$prob(\text{event}) = \frac{e^z}{1 + e^z} \quad (14)$$

where, prob(event) is used for estimating the probability of an event occurring. For diagnosing cancer, it can be the probability of the case being malignant. z is the linear combination:

$$z = \beta_0 + \beta_1 x_1 + \beta_2 x_2 + \ldots + \beta_k x_k \quad (15)$$

$x_1, x_2 \ldots x_k$ are continues or categorical independent variables.

The probability of the event not occurring is estimated as:

Prob (no event)=1−Prob (event)

Discriminant analysis ("DA") as a whole is concerned with the relationship between a categorical variable and a set of inter-related variables. More precisely, suppose there is a finite number k of distinct populations, categories, classes or groups. In discriminant analysis the existence of the groups is typically known a priori. For example, in the context of breast cancer, there are two (k=2) types of mammograms, namely malignant and benign. In order to classify a particular individual as to which of the two groups it belongs, the procedure would be to compare the distance (Mahalanobis distance) of the particular individual of unknown origin from the mean of the respective groups. That is, after measuring the appropriate variables (i.e., features for classification when used in the context of breast cancer) compute the Mahalanobis distance of it from each group mean and classify the mammogram as follows:

Allocate a mammogram with the observation vector $X=(x_1, x_2, x_3 \ldots x_n)$ to group 1 (malignant) if $D_1^2 < D_2^2$, otherwise as benign (group 2).

Here $D_1$ and $D_2$ are the Mahalanobis distances, and $$D_1^2 = (X-\overline{X}_1)^T S^{-1}(X-\overline{X}_1)$$

$$D_2^2 = (X-\overline{X}_2)^T S^{-1}(X-\overline{X}_2)$$

where $\overline{X}_1$ and $\overline{X}_2$ are the group mean vectors of the known two groups. S is the common covariance matrix.

The above rule will lead to a linear discriminant function (ldf) which is easy to handle. Linear combinations of the independent variables, sometimes called predictors, are formed and serve as the basis for classifying cases into one of the groups. Thus, information contained in multiple independent variables is summarized in a single index. For example, by finding a weighted average of variables (features) such as pixel numbers, average grey level, and patient age, a score may be obtained that distinguishes the malignant cases from those that are benign. In discriminant analysis, the weights of the variables are estimated so that they result in the "best" separation between the groups.

The linear discriminant equation:

$$D = \beta_0 + \beta_1 x_1 + \beta_2 x_2 + \ldots + \beta_n x_n \quad (16)$$

is similar to the multiple linear regression equation. $x_1, x_2, x_3 \ldots x_n$ are the values of the independent variables and the $\beta_1, \beta_2, \beta_3 \ldots \beta_n$ are coefficients estimated from the data. If the discriminant analysis function is to classify the benign and malignant cancer, the two groups must differ in their D (discriminant score) values. Therefore, the βs are chosen so that the values of the discriminant function differ as much as possible between the groups, or that for the discriminant scores the ratio:

$$\frac{\text{between} - \text{groups sum of squares}}{\text{within} - \text{groups sum of squares}} \quad (17)$$

is a maximum:

Based on the coefficients, it is possible to calculate the discriminant score for each case by equation (16).

Using the discriminant score, it is possible to obtain a rule for classifying cases into one of the two groups. The technique used in SPSS discriminant is based on Bayes' rule. The probability that a case with a discriminant score of D belongs to group i is estimated by:

$$P(G_i | D) = \frac{P(D|G_i)P(G_i)}{\sum_{i=1}^{g} P(D|G_i)P(G_i)} \quad (18)$$

$P(G_i)$ is the prior probability which is the estimate of the likelihood that a case belongs to a particular group when no information about it is available. $P(D|G_i)$ is the conditional probability of D given the group i. A case is classified, based on its discriminant score D, in the group for which the posterior probability $P(G_i|D)$ is the largest. That is, it is assigned to the most likely group based on its discriminant score.

Multivariate adaptive regression splines ("MARS") is a flexible modelling tool that automates the building of accurate predictive models for continuous and binary dependent variables. It applies an approach to regression modelling effectively uncovering important data patterns and relationships that are difficult for other methods to reveal.

MARS essentially builds flexible models by fitting piecewise linear regressions, that is, the nonlinearity of a model is approximated through the use of separate regression slopes in distinct intervals of the predictor variable space. In other words, the regression line is allowed to bend.

The preferred aim of the MARS procedure is to combine recursive partitioning and spline fitting in a way that best retains the positive aspects of both, while being less vulnerable to their unfavorable properties.

The recursive partitioning regression model takes the form:

$$f(x) = \sum_{m=1}^{M} a_m B_m(x) \quad (19)$$

Here $\{a_m\}_1^M$ are the coefficients of the expansion whose values are jointly adjusted to give the best fit to the data. $B_m$ are the basis functions which take the form:

$$B_m(x) = I[x \in R_m] \quad (20)$$

I is an indicator function having the value one if its argument is true and zero if otherwise. The $\{R_m\}_1^M$ are disjoint subregions representing a partition of D. The partitioning is accomplished through the recursive splitting of previous subregions. The starting region is the entire domain D. At each stage of the partitioning all existing subregions are each optimally split into two subregions. The eligible splits of a region R into two subregions $R_l$ and $R_r$ take the form if $x \in R_m$, then
    if $x_v \leq t$, then $x \in R_l$
    else $x \in R_r$
end if.

Here v labels one of the covariates and t is the value on that variable. The split is jointly optimized over $1 \leq v \leq n$ (the whole number of variables) and $-\infty \leq t \leq \infty$ using a goodness-of-fit criterion on the resulting approximation (19). This procedure generates hyper-rectangular axis oriented subregions. The recursive subdivision is continued until a large number of subregions are generated. The subregions are then recombined in a reverse manner until an optimal set is reached, based on criterion that penalizes both for lack-of-fit and increasing number of regions.

Recursive partitioning is a powerful paradigm, especially if the simple piecewise constant approximation (20) is used. However, it has some fairly severe restrictions that can limit its effectiveness, such as that the approximation function is discontinuous at the subregion boundaries and that recursive partitioning functions are difficult to approximate.

MARS modified the recursive partitioning algorithm, retained the adaptability of recursive partitioning and overcame its disadvantages. It produces continuous models by using the truncated power spline basis functions. MARS also constructs the relationship between the dependent variables and independent variable from a set of coefficients and the basis functions. The basis function is the core building block of the MARS model and is often applied to a single variable multiple times. The hockey stick function below maps variable x to basis functions.

$$\max(0, x-c)$$

or $\max(0, c-x)$ where x is an independent variable and c a constant. For max(0,x−c), it is set to 0 for all values of x up to some threshold value c and is equal to x for all values of x greater than c. By mixing the two types of basis functions presented above and providing adequate values for c, it is possible to approximate any functional shape. Basis functions are used as the new independent variables, instead of using the original x, of final regression models.

The key concept underlying the spline is the knot. A knot marks the end of one region of data and the beginning of another. MARS finds the location and number of needed knots in a forward/backward stepwise fashion. It starts with just a constant in the model and then begins the search for a variable-knot combination that improves the model the most. The improvement is measured in part by the change in mean squared error (MSE).

The forward stepwise algorithm is preferably used in MARS for building the model which is comprised of the entire basis function set. A backward stepwise procedure of the kind ordinarily employed with regression subset selection is preferably applied for feature selection in MARS. The model is preferably generously over fit and then the unneeded basis functions are removed.

To calculate the variable importance scores, MARS refits the model after dropping all terms involving the variable in question and calculating the reduction in goodness of fit. The least important variable is the one with the smallest impact on the model quality. Similarly, the most important variable is the one that, when omitted, degrades the model fit the most.

MARS also looks for interaction terms among basis functions, thus leading to the modeling of the interactions among independent variables. It builds up interactions by combining a single previously entered basis function with a new basis functions. One of the member variables of the interaction must first appear as a main effect basis function, and then interaction can be created between this variable and the second one.

In MARS, a categorical variable is expanded into a set of dummy variables, one for each level of the categorical predictor. MARS may generate fewer dummies than there are levels of the predictor and the dummies generated may "overlap" and thus may not be mutually exclusive. For example, a feature variable "assessment" with four levels 1, 2, 3 or 4. MARS might generate the following basis functions or dummy variables:

Assessment: 1010
Assessment: 1001
Assessment: 0110

The first basis function represents assessment level 1 and 3, the second represents level 1 and 4, and the third represents 2 and 3.

More details about MARS may be found in "Multivariate Adaptive Regression Splines User Guide," (2001), Salford Systems, the entire contents of which is hereby incorporated herein by reference.

A neural network ("NN") typically involves an artificial neuron, where a set of inputs is applied, each representing an output of another neuron. Each input is multiplied by a corresponding weight which is analogous to synaptic strengths in biological neurons. The weighted inputs are summed to determine the net input of the neuron. This net input is processed further by using a squashing function (activation function), to produce the neuron's output signal. This function may be linear, nonlinear (e.g. step function) or sigmoid (S shaped).

Different neural network topologies exist. The multi-layer perceptron neural network ("MLPNN") is used in a number of practical problems. It consists of an input layer of neurons, one or more hidden layers of neurons, and an output layer of neurons.

A genetic algorithm ("GA") is a stochastic search mechanism based on natural selection concepts, which was developed by John Holland in the 1970's. It is based on a Darwinian-type survival of the fittest strategy, whereby potential solutions to a problem compete and mate with each other in order to produce increasingly stronger individuals. Each individual in the population represents a potential solution to the problem that is to be solved; i.e., the optimization of some generally very complex function.

These individuals are represented in the GA by means of a linear string, similar to the way genetic information in organisms is coded onto chromosomes. In GA terminology the members of a population are therefore referred to as chromosomes. Chromosomes are assembled from a set of genes that are generally characters belonging to a certain alphabet A. A chromosome can be thought of as a vector x consisting of l genes $a_i$:

$$x=(a_1, a_2, \ldots, a_l), a_i \in A$$

l is referred to as the length of the chromosome. Commonly all alphabets in a chromosome are the same: $A=A_1=A_2=\ldots=A_l$. The alphabets commonly used today are the cases of binary genes ($A=\{0,1\}$), and real-valued genes (A=real_value). In the latter case, the real values can be stored in a gene by means of a fixed or floating point representation or by a conversion to an integer.

In biological systems, a genotype of the total genetic package is a structure made up of several chromosomes. The phenotype is the actual organism formed by the interaction of the genotype with its environment. In GA, an individual is usually represented by a single chromosome, so the chromosome and the genotype are one and the same. The term "individual" here is used for a member of the population where the genotype x of this member refers to the chromosome and the phenotype to the observed structure acting as a potential solution to the problem.

GAs therefore rely on a dual representation of individuals where a mapping function is needed between the two representations: the genotype or representation space and the phenotype or problem space. The fitness of a chromosome is, in general, a mapping of the chromosome to a real positive value, which measures the individual's performance on the problem. In GAs this mapping is usually deterministic and constant. The fitness function should preferably reflect the individual's performance on the actual problem.

The following steps describe the operation of a standard genetic algorithm:
1. Randomly create an initial population of chromosomes with chosen size.
   The initial population is filled with chromosomes that have randomly valued genes. For binary valued chromosomes, each gene can take on the value '0' and '1', with equal probability. With real valued chromosomes, various distributions are possible. The range should be chosen so the resulting values are in a logical scope for the problem at hand.

2. Compute the fitness of every member of the current population.

For every member of the current population, the fitness is evaluated. For example, in diagnosing a disease, the classification rate is used as the fitness function.

3. If there is a member of the current population that satisfies the problem requirements, then stop. Otherwise, continue with the next step.

The stopping criterion is usually set to the point in time, when an individual has been found that gives an adequate solution to the problem, or alternatively when a set maximum number or generations has been run. It can also be set equal to the point where the population has converged to a single solution, so that no further improvement would be expected from this particular run.

4. Create an intermediate population by extracting members from the current population using the reproduction and selection operator.

There are many possibilities for the extraction of members from the current population. The selection operator selects the certain chromosomes and places them into the intermediate population. Various selection operators have been developed, such as roulette wheel selection and tournament selection are the most popular and well-studied selection methods.

5. Generate a new population by applying the genetic operators, crossover and mutation to this intermediate population.

6. Go back to step 2.

The present invention preferably utilises a neural network with double genetic algorithms ("GANN") as a component for breast abnormality classification. In the GANN, preferably two genetic algorithms are involved, one for feature selection and one for NN training respectively. The GA for feature selection aims to find the best feature sets for classifying the breast abnormalities, with NN as the classifier. A predefined NN is trained by another GA. In other words, this GA is used for finding the best weights of the NN.

For NN application, the original features extracted from the mammogram are preferably normalized to improve the training efficiency. All the features are preferably normalized as the real numbers in the range of 0 to 1 based on the whole dataset used for training and testing.

The normalization may be accomplished by the following steps:

1) Change all the features to be positive by adding the magnitude of the largest minus value of this feature times 1.1. Here 1.1 is used for getting rid of the zero values. This step is preferably used when there are existing minus values.
2) Extract the maximum value of every feature in the whole dataset including training and testing set.
3) Use the positive features produced from step 1, and divide the maximum value of the same feature for every feature of every case.

The normalization implementation algorithm can be described as:

```
For all features (Fi)
    Find minimum Fi → minFi
        If minFi<0 ;   (minFi is the minimum value of Fi)
            Fi=Fi+1.1*minFi
        End if
        Find maximum Fi → maxFi;   (maxFi is the maximum value of Fi)
        Normalized feature normFi=Fi/maxFi;
End for
```

The following steps describe a preferred operation of the genetic algorithm for feature subset selection for use in diagnosing breast cancer. In the process, every NN with the selected features as inputs, which are used for classification, is preferably trained separately by another GA.

Step 1: Initialize one population.

Figure 2:
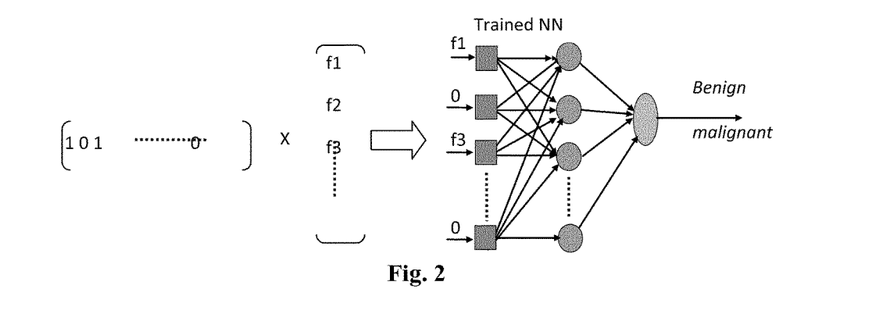
FIG. 2 is a flow diagram showing an application of a genetic algorithm for feature selection in combination with a neural network.

Step 2: For every individual, generate the inputs for the NN and get the parameters from the trained NNs, as shown in FIG. 2. The input vector with the selected features is created by multiplying the selection vector and feature array. In FIG. 2, f1, f2 . . . f25 represent the set of 25 original features.

Step 3: Compute the fitness from the classification rate for every individual of the current population.

Step 4: Reproduce the new population by performing selection strategy (roulette wheel selection), crossover and mutation operators.

1 point crossover is preferably applied in the present invention for feature selection. The mutation is implemented by simply changing "0" to "1," or vice versa.

Step 5: Calculate the fitness of the new population and check if the generation reaches 300. If it reached 300, go back to step 2.

Relevant exemplary GA parameter settings for using the present invention for feature selection are:

Population size: 30
Number of generation 300
Probability of crossover: 0.8
Probability of mutation: 0.2

The GA for feature selection involves many generations. In each generation, evaluation of an individual which is a feature subset, involves a training of the neural network.

A standard genetic algorithm with a roulette wheel selection strategy is also preferably used for NN training. In the process of NN training, the genes of preferably every individual in the population represent the weights between input and hidden layer and the weights between hidden layer and output of the NN.

A preferred implementation for NN training for use in diagnosing breast cancer can be described in following steps:

Step 1: Initialize the genes (weights) randomly for every individual NN in the whole population mapped into the closed interval [−1,1].

Step 2: Calculate the fitness of each member in the population. In this case, the fitness is calculated according to the classification error of the training pair. The activation function used in the NN training is:

$$f = \frac{1}{1+e^{-x}}$$

The output of each of the hidden neurons can be found using the equation $$\left\{ h_i = f\left(\sum_{j=1}^{n} w_{ij} I_j\right) \right\},$$

where i is from 1 to the number of hidden nodes, j is from 1 to the number of training pairs. l represents the inputs, and w represents the weight between input layer and hidden layer.

The output of the NN can be calculated by $$\left\{ O = f\left(\sum_{i=1}^{n} w_i h_i\right) \right\},$$

where $w_i$ is the weight between ith hidden unit and the output.

Step 3: Reproduce an intermediate population by keeping the best individual, which achieved the best classification rate, and using a roulette wheel selection operator.

Step 4: Create new population for next generation from the intermediate population by applying crossover and mutation operators with certain probabilities.

Here crossover is performed by 2 points real value crossover. Two points (point1 and point2) are selected randomly, where
point1<point2;
point1>1;
and point2<n;
n is the number of genes (weights) of one individual NN.

If the two parents are $w_1, w_2 \ldots w_n$ and $w'_1, w'_2 \ldots w'_n$, the two children after the crossover operation are:

$$\frac{2w_1 + w'_1}{3}, \frac{2w_2 + w'_2}{3}, \ldots \frac{2w_{point1} + w'_{point1}}{3},$$

$$\frac{w_{point1+1} + 2w'_{point1+1}}{3}, \ldots \frac{w_{point2-1} + 2w'_{point2-1}}{3},$$

$$\frac{2w_{point2} + w'_{point2}}{3}, \ldots \frac{2w_n + w'_n}{3} \text{ and } \frac{w_1 + 2w'_1}{3},$$

$$\frac{w_2 + 2w'_2}{3}, \ldots \frac{w_{point1} + 2w'_{point1}}{3}, \frac{2w_{point1+1} + w'_{point1+1}}{3},$$

$$\ldots \frac{2w_{point2-1} + w'_{point2-1}}{3}, \frac{w_{point2} + 2w'_{point2}}{3}, \ldots \frac{w_n + 2w'_n}{3}.$$

For mutation, a small random value between 0.1 and 0.2 is added to every weight of selected members that would perform mutation.

Step 5: Check the GA stop criteria, if the goal of RMS error is less than 0.0001 (or classification rate=100%) or the generation number runs out, then stop. Otherwise go back to step 2.

After NN is trained, the best weights of the NN are saved. The trained NN is applied for testing the new cases, and the classification rate (training/testing) are saved for the further features selection.

In the preferred hybrid system, the membership probability numerical values from LR, DA and MARS models (instead of the value 0 or 1) are used as the second order features for combining with original features. All of the features are preferably fed to a neural classifier which involves GA for feature selection.

Referring again to FIG. 1, preferably the entire original selection features extracted from the mammogram are used as independent variables for logistic regression (LR) classification (30). The predicted numerical probabilities of group membership are preferably saved in a computer readable format. In this step, density, mass shape, mass margin, assessment and subtlety are all preferably described as categorical variables.

Preferably the same selection features are used as the independent variables for discriminant analysis (DA) classification (40), with the predicted probabilities of group membership being saved in a computer readable format.

Preferably the whole set of original selection features are used as the predictors (independent variables) for MARS model (50), with the output of the final function for every case including training and testing sets being saved in a computer readable format. In this step, the features described as categorical variables in the LR step are also preferably utilised as categorical variables.

A feature vector is preferably created for every suspicious area with the original features plus the outputs from the LR, DA and MARS models. In this step a file with vectors including 28 features for all the cases is created.

The features are preferably normalized (60) before the feature file can be efficiently used by NN. The normalized combined feature-vectors are fed into the neural network (80) for further classification in conjunction with GA (70) for feature selection, described above.

The Double Genetic NN (90) described above is preferably used for the final classification in the hybrid system. The whole set of features for feeding the GANN includes the 25 original features mentioned before, and another 3 features which are the second order features produced by the statistical classifiers. As shown in FIG. 1, a neural-genetic algorithm (70) is also involved for feature selection based on these features with neural network (80) as classifier.

In feature selection GA, preferably each individual in the population represents a candidate solution to the feature subset selection problem. When 28 features are utilized (25 original features, plus the 3 second order features), there are $2^{28}$ possible feature subsets. A binary vector of dimension 28 represents the individual in the population. A value of 0 indicates that the corresponding feature is not selected, and a value 1 means that the feature is selected. An initial population of chromosomes is randomly generated. 1-point binary crossover and binary mutation are performed. The roulette wheel selection strategy is also used in the algorithm for feature selection. Preferably the relevant parameter settings are: Population size 40; Number of generation 300; Probability of crossover 0.8; Probability of mutation 0.2. The fitness of the chromosome is calculated according to the testing classification rate of the evolved subset of features.

The selected features are used for feeding NNs which are used for classification. The number of the inputs is preferably decided by the automated selection of GA processing. One hidden layer is preferably used in the NN. The nodes of hidden layer are preferably adjusted in order to achieve optimum classification rates. One output of NN is preferably used. The desired output may be specified as 0 for benign and 1 for malignant.

A standard genetic algorithm with a roulette wheel selection strategy is preferably used for training the NNs. 2-points real value crossover and small random value mutation are performed respectively. Preferably the parameters are set as: Population size 50; Number of generation 100; Probability of crossover 0.8; Probability of mutation 0.02.

It will be appreciated that the steps described above may be performed in a different order, varied, or some steps omitted entirely without departing from the scope of the present invention.

The foregoing description is by way of example only, and may be varied considerably without departing from the scope of the present invention. For example only, instead of using MARS, support vector machine ("SVM") may be utilised as a statistical application. SVM is described further below.

In general, all SVMs can be classified into two types: linear SVM and non-linear SVM. For non-linear SVM, a kernel function is required, which plays a central role in implicitly mapping the input vectors into a high-dimensional feature space.

For two classes classification, suppose the training set consists of N pairs $\{(x_i, y_i)\}$, i=1, 2, . . . N, $x_i \in R^n$, $y_i \in \{-1, +1\}$, and each pair contains input vector $x_i$ the desired output $y_i$. If the training data are linearly separable, SVM constructs a hyperplane which maximizing the margin, to separate the two classes in n-dimensional space. If the training data are not linearly separable, SVM maps the data to the other Hilbert space H (also called feature space), using a mapping $\Phi$:

$$\Phi: x_i \in R^n \rightarrow H^{>n}$$

The training algorithm would only depend on the data through dot products in H. The mapping $\Phi$ is implemented by a kernel function K that satisfies Mercer's conditions such that $K(x_i, y_i) = \Phi(x_i)\Phi(y_j)$. Then in the high-dimensional feature space H, SVM finds an optimal hyperplane by maximizing the margin and bounding the number of training errors. Mercer's conditions tells us whether or not a prospective kernel is actually a dot product in some space, but it does not tell us how to construct $\Phi$ or even what H is. However, SVM explicitly constructs the mapping for some kernels.

A few kernel functions have been investigated for the pattern recognition problem, such as linear kernel, polynomial function and radial basis function kernels. The following equation (21) results in a classifier that is a polynomial of degree d in the data. Equation (22) gives a Gaussian radial basis function classifier.

$$K(x,y) = (x*y+1)^d \tag{21}$$

$$K(x,y) = e^{-\gamma \|x-y\|^2} \tag{22}$$

The decision function can be given by Equation (23) below:

$$f(x) = \sum_{i=1}^{N} y_i a_i K(x_i, x) - b \tag{23}$$

where f(x)>threshold (e.g. 0), indicate the case belong to the class 1 (cancerous in this case), and f(x)<threshold indicate the corresponding case belongs to class −1 (benign mammogram).

Training the SVM for the pattern recognition problem leads to an optimization quadratic problem. It is to find $a_i$, i=1, . . . N, which can be achieved by solving the following quadratic programming:

$$\text{Maximum } w(a) = \sum_{i=1}^{N} a_i - \frac{1}{2} \sum_{i=1}^{N} \sum_{j=1}^{N} a_i a_j y_i y_j K(x_i, x_j) \tag{24}$$

Subject to $0 \leq a_i \leq C$ i=1, . . . , N and $$\sum_{i=1}^{N} a_i y_i = 0$$

where C is a parameter which can be used to allow some misclassified training examples. A larger C corresponds to a higher penalty allocated to the training errors.

The present invention in one preferred embodiment includes a system having at least one input for receiving a set of selection features relating to information about a subject which has an abnormality. As would be appreciated, such an input could be a keyboard, a voice activated means, or any other type of input device adapted to convey data to a processor.

The system preferably includes at least one processor coupled to the input. The processor is preferably configured to generate further selection features from at least three statistical calculations performed on the set of selection features. The processor may be a computer adapted to run a software program having the statistical applications and configured to provide a result when the data is entered into the program.

The system preferably includes a neural network adapted to determine whether the abnormality is malignant or benign utilising the set of selection features and the further selection features.

The statistical applications programmed into the software preferably include those set forth above in relation to the method. The software component may be provided separately from or integrally with the processor as desired. The system may further include image processing software if desired. It is envisaged that the system and method of the present invention may be utilised with three-dimensional holographic projections. The processor may be programmed to provide further selection features from more or less than three statistical applications if desired. For example, the processor may be adapted to provide further selection features utilising only MARS or SVM if desired.

It will be appreciated that ways other than statistical applications may be used to provide further selection features, or second order selection features. For example, data mining techniques or other classifiers such as neural networks, decision trees, associated rule mining, and case-based reasoning, or a combination of any of the foregoing, may be used to provide second order selection features which may be eventually fed into a neural network.

Other applications may be used in place of or in addition to NN as a final classifier. For example, NN may be substituted by SVM for final classification if desired.

The features described with respect to one embodiment may be applied to other embodiments, or combined with or interchanged with the features other embodiments, as appropriate, without departing from the scope of the present invention.

The present invention may be used with a user friendly internet-based system for analysis of digital mammogram. Integrated systems which combine cancer diagnosis methodology and immune therapy modelling are contemplated. The present invention described above can be used in the detection or diagnosis of other cancers. Also these models can be modified and used in other research areas, for example, in finance, economics, agricultures, sociology, psychology and biology.

EXAMPLES

For comparing the different classification methods, the experiments were conducted using the same dataset with three different splits of 200 masses or 200 calcifications for training and testing.

In the experiment, 200 masses and 200 calcification cases were selected from the Digital Database for Screening Mammography ("DDSM"). The DDSM contains mammograms obtained from Massachusetts General Hospital, Wake Forest University School of Medicine, Sacred Heart Hospital and Washington University of St. Louis School of Medicine. The mammograms from mediolateral oblique "(MLO") and Crabuak-Ccaudal ("CC") views for each case have been digitized on one of four different digitizers which are DBA M2100 ImageClear, Howtek 960, Lumisys 200 Laser and Howtek MultiRad850. More information about the digitizers can be retrieved from DDSM website http://marathon.csee.usf.edu/Mammography/DDSM. All the cases used here had been scanned with the Howtek 960 scanner from the CC view at the full 43.5 micron per pixel spatial resolution.

Split 1 (split1) of the dataset includes 100 cases (calcifications or masses) for training and 100 cases for testing. There are equal benign and malignant cases included in the training dataset, and also 50 malignant with 50 benign cases included in the testing set. In split 2 (split2), 65 malignant mass/calcification cases and 65 benign mass/calcification cases were randomly selected for training, 35 malignant cases and 35 benign cases for testing. Split 3 (split3) uses 150 cases for training, which consists of 75 malignant cases and 75 benign ones, the rest of whole 200 mass or calcification cases for testing.

In the experiments, computer extracted features, human interpreted features and the merged features (include both computer extracted and human interpreted features) were tested separately. The feature significance analysis and feature selection were also involved along with the experiments.

The tables show the classification results accordingly. "25features" represents the whole feature set which include 18 computer extracted features and 7 human interpreted features. "18features" represents the feature set which includes only the 18 computer extracted features calculated based on the pixel and grey level values. "7features" means that the feature set consists of only the 7 human interpreted features mentioned above.

In all the tables presenting the classification results, "Hidden Units" represents the hidden unit numbers of the NN used for the experiments. The 1 s and 0 s in "Feature Selection" column represent whether the corresponded feature is selected or not selected. The first 25 digits represent the same sequence of the original features used for GANN. The last 3 digits represent if the second order features were selected, which are the outputs from LR, DA and MARS models respectively. "B→C Error" and "C→Error" are used for representing two types of errors, benign to cancer or cancer to benign.

Table 1, Table 2 and Table 3 show the mass classification results and the feature selection utilizing the hybrid system ("LDM-GNN") 1 (FIG. 1) of the present invention. All the classification rates shown here are based on using output threshold value of 0.5 with the output range from 0 to 1. In the experiments using split1 and split2 of the mass dataset, the classification rates show the overall improvement more than any other single model. The highest testing classification rate produced by the hybrid system in the experiment using split3 of the dataset is the same as it was produced in GANN model.

TABLE 1

LDM-GNN Classification Results with Feature Selection using Split1 of Mass Dataset

| | | Training | | | Testing | | |
|---|---|---|---|---|---|---|---|
| Hidden Units | Feature Selection | B→C Error | C→B Error | Accuracy (%) | B→C Error | C→B Error | Accuracy (%) |
| 8 | 1101011100000100100011001100 | 0 | 3 | 97.0 | 4 | 6 | 90.0 |
| 10 | 0101011111101101011000001101 | 2 | 5 | 93.0 | 5 | 3 | 92.0 |
| 12 | 1001100000010101000000001111 | 6 | 2 | 87.0 | 8 | 1 | 91.0 |
| 14 | 1101010111000001010101101111 | 3 | 1 | 96.0 | 3 | 6 | 91.0 |
| 16 | 1111000010100110111101111010 | 5 | 9 | 86.0 | 8 | 4 | 88.0 |
| 18 | 0011110110001001110101100011 | 4 | 4 | 92.0 | 2 | 4 | 94.0 |
| 20 | 0100100000010101011110110101 | 2 | 6 | 92.0 | 3 | 8 | 89.0 |
| 22 | 1001110111001010011100000110 | 2 | 7 | 91.0 | 5 | 8 | 87.0 |
| 24 | 1000100000001101110101010011 | 3 | 4 | 93.0 | 7 | 5 | 88.0 |
| 26 | 1010010110001000001010100111 | 4 | 4 | 92.0 | 3 | 7 | 90.0 |

TABLE 2

LDM-GNN Classification Results with Feature Selection using Split2 of Mass Dataset

| | | Training | | | Testing | | |
|---|---|---|---|---|---|---|---|
| Hidden Units | Feature Selection | B→C Error | C→B Error | Accuracy (%) | B→C Error | C→B Error | Accuracy (%) |
| 8 | 1000010100000110110000110101 | 1 | 0 | 99.2 | 3 | 3 | 91.4 |
| 10 | 1101100100100000010101000100 | 2 | 2 | 96.9 | 4 | 1 | 92.9 |
| 12 | 0000111010010001110001101100 | 0 | 0 | 100.0 | 5 | 0 | 92.9 |
| 14 | 1010101110110100110101010111 | 2 | 0 | 98.5 | 5 | 0 | 92.9 |
| 16 | 1000011100011010100001000101 | 1 | 0 | 99.2 | 1 | 4 | 92.9 |
| 18 | 1101110110010111001100000111 | 2 | 0 | 98.5 | 4 | 0 | 94.3 |
| 20 | 1011110110101011110111000110 | 1 | 0 | 99.2 | 5 | 0 | 92.9 |
| 22 | 1001000000010010100001100111 | 1 | 1 | 98.5 | 4 | 1 | 92.9 |

TABLE 2-continued

LDM-GNN Classification Results with
Feature Selection using Split2 of Mass Dataset

| | | Training | | | Testing | | |
|---|---|---|---|---|---|---|---|
| Hidden Units | Feature Selection | B→C Error | C→B Error | Accuracy (%) | B→C Error | C→B Error | Accuracy (%) |
| 24 | 100111000011111000001000111 | 0 | 0 | 100.0 | 4 | 1 | 92.9 |
| 26 | 000111000111110100100100011 | 2 | 1 | 97.7 | 3 | 2 | 92.9 |

TABLE 3

LDM-GNN Classification Results with
Feature Selection using Split3 of Mass Dataset

| | | Training | | | Testing | | |
|---|---|---|---|---|---|---|---|
| Hidden Units | Feature Selection | B→C Error | C→B Error | Accuracy (%) | B→C Error | C→B Error | Accuracy (%) |
| 8 | 00110111010100101011111110101 | 6 | 6 | 92.0 | 5 | 2 | 86.0 |
| 10 | 11101011000100101010000001010 | 10 | 8 | 88.0 | 2 | 2 | 92.0 |
| 12 | 10000101001000011011111010001 | 9 | 6 | 90.0 | 2 | 5 | 86.0 |
| 14 | 10011110010110101110001000101 | 11 | 4 | 90.0 | 2 | 2 | 92.0 |
| 16 | 01111011110000010010001100101 | 18 | 8 | 82.7 | 3 | 1 | 92.0 |
| 18 | 01011001101101110101100100011 | 6 | 3 | 94.0 | 2 | 3 | 90.0 |
| 20 | 100101110111100111010110011 | 5 | 5 | 93.3 | 2 | 2 | 92.0 |
| 22 | 11101111100110010101011011111 | 7 | 4 | 92.7 | 3 | 2 | 90.0 |
| 24 | 10100011100111100100010001001 | 7 | 13 | 86.7 | 3 | 3 | 88.0 |
| 26 | 10011110011011010010011001011 | 13 | 3 | 89.3 | 5 | 2 | 86.0 |

The corresponding classification rates were reached when using threshold 0.5 shown in Table 1 to Table 3 are highlighted.

Table 4, Table 5 and Table 6 show the calcification classification results and the feature selection in the hybrid model 1 (FIG. 1) of the present invention. The overall classification rates showed the obvious improvement more than any other single model.

TABLE 4

LDM-GNN Classification Results with
Feature Selection using Split1 of the Calcification Dataset

| | | Training | | | Testing | | |
|---|---|---|---|---|---|---|---|
| Hidden Units | Feature Selection | B→C Error | C→B Error | Accuracy (%) | B→C Error | C→B Error | Accuracy (%) |
| 8 | 11100010101110000101111100001 | 10 | 9 | 81.0 | 11 | 10 | 79.0 |
| 10 | 11100110010001010001100000001 | 2 | 15 | 83.0 | 14 | 6 | 80.0 |
| 12 | 01000101101000000010101000111 | 4 | 13 | 83.0 | 14 | 6 | 80.0 |
| 14 | 10111000011001000000001011101 | 9 | 13 | 79.0 | 11 | 11 | 78.0 |
| 16 | 11111001101000000101000011101 | 10 | 12 | 78.0 | 8 | 12 | 80.0 |
| 18 | 11101010010011110100000010100 | 16 | 11 | 73.0 | 11 | 10 | 79.0 |
| 20 | 00001000000011011101010001111 | 10 | 15 | 75.0 | 9 | 12 | 79.0 |
| 22 | 0100111001101000101000101111 | 10 | 7 | 83.0 | 11 | 9 | 80.0 |
| 24 | 10010011000111101011010101100 | 11 | 13 | 76.0 | 7 | 13 | 80.0 |
| 26 | 10000101111010101011010101011 | 11 | 9 | 80.0 | 9 | 12 | 79.0 |

TABLE 5

LDM-GNN Classification Results with
Feature Selection using Split2 of the Calcification Dataset

| | | Training | | | Testing | | |
|---|---|---|---|---|---|---|---|
| Hidden Units | Feature Selection | B→C Error | C→B Error | Accuracy (%) | B→C Error | C→B Error | Accuracy (%) |
| 8 | 100010100100101100010110011 | 23 | 6 | 77.7 | 17 | 3 | 71.4 |
| 10 | 111100010110010000001101010 | 23 | 7 | 76.9 | 15 | 6 | 70.0 |
| 12 | 000111000000100101110011100 | 26 | 12 | 70.8 | 11 | 7 | 74.3 |
| 14 | 110011110010101011101010011 | 22 | 4 | 80.0 | 17 | 1 | 74.3 |
| 16 | 110001000010101010111000001 | 19 | 15 | 73.8 | 10 | 9 | 72.9 |
| 18 | 110001011010000001010100011 | 23 | 9 | 75.4 | 13 | 5 | 74.3 |
| 20 | 011010000011000110001011101 | 18 | 2 | 84.6 | 16 | 1 | 75.7 |
| 22 | 011001100010111011000110101 | 20 | 3 | 82.3 | 15 | 2 | 75.7 |
| 24 | 100000011001100011011010110 | 17 | 14 | 76.2 | 12 | 6 | 74.3 |
| 26 | 101100100110100101001001011 | 16 | 14 | 76.9 | 11 | 6 | 75.7 |

TABLE 6

LDM-GNN Classification Results with Feature Selection
using Split3 of the Calcification Dataset

| | | Training | | | Testing | | |
|---|---|---|---|---|---|---|---|
| Hidden Units | Feature Selection | B→C Error | C→B Error | Accuracy (%) | B→C Error | C→B Error | Accuracy (%) |
| 8 | 101000110000010011000011001 | 22 | 13 | 76.7 | 6 | 7 | 74.0 |
| 10 | 101001101000001000101110010 | 15 | 23 | 74.7 | 3 | 9 | 76.0 |
| 12 | 100100001100111001011011101 | 26 | 5 | 79.3 | 8 | 3 | 78.0 |
| 14 | 010010000101011100100000101 | 31 | 7 | 74.7 | 9 | 2 | 78.0 |
| 16 | 101011111001000100110000101 | 31 | 4 | 76.7 | 9 | 3 | 76.0 |
| 18 | 101101110101100100011001001 | 39 | 5 | 70.7 | 9 | 3 | 76.0 |
| 20 | 110001001000111100011001100 | 27 | 11 | 74.7 | 8 | 3 | 78.0 |
| 22 | 010001001000000110011111101 | 22 | 8 | 80.0 | 7 | 4 | 78.0 |
| 24 | 110011001001100110010011111 | 24 | 7 | 79.3 | 7 | 4 | 78.0 |
| 26 | 001101110101100100011001011 | 21 | 11 | 78.7 | 8 | 4 | 76.0 |

The corresponding classification rates reached when using threshold 0.5 shown in Table 4 to Table 6 are also highlighted.

The hybrid system showed overall improvement in terms of the classification rates based on the output threshold value of 0.5 for both mass and calcification classification. Table 7 shows the summary classification results using the hybrid system for mass and classification. In Table 7, "TR" is training, while "TE" is testing.

TABLE 7

Summary Mass and Calcification Classification Results with LDM-GNN

| | Classification Rate (%) | | | | | | | |
|---|---|---|---|---|---|---|---|---|
| Data Set | Split1 | | Split2 | | Split3 | | Average | |
| | TR | TE | TR | TE | TR | TE | TR | TE |
| Mass | 92.0 | 94.0 | 98.5 | 94.3 | 93.3 | 92.0 | 94.6 | 93.4 |
| Calcification | 86.0 | 80.0 | 84.6 | 75.7 | 80.0 | 78.0 | 83.5 | 77.9 |

The overall performance of hybrid system is also better than or at least as good as any other single model, especially for calcification classification. The area values below the Receiver/Radar Operating Characteristics ("ROC") curves are summarized in Table 8.

TABLE 8

Area Values under the ROC Curves in Experiments using LDM-GNN

| | Area value under the ROC curve | | | |
|---|---|---|---|---|
| Dataset | Split1 | Split2 | Split3 | Average |
| mass | 0.956 | 0.961 | 0.936 | 0.951 |
| calcification | 0.886 | 0.731 | 0.771 | 0.796 |

The feature selection from the hybrid system is shown in the tables below. In all these tables, "LR", "DA" and "MARS" represent the second order features which are the outputs from LR, DA and MARS respectively.

The selected feature sets which produced the highest classification rates in the experiments using different splits of the mass dataset are listed in Table 9. A few features including MARS output are included in all the best selections.

TABLE 9

Feature Sets Selected in Experiments using LDM-GNN for Mass Classification

| Data set | Selected Features |
|---|---|
| Split1 | v3, v4, v5, v6, v8, v9, v13, v16, v17, v18, density, margin, assessment, DA and MARS |

TABLE 9-continued

Feature Sets Selected in Experiments using LDM-GNN for Mass Classification

| Data set | Selected Features |
|---|---|
| Split2 | v1, v2, v4, v5, v6, v8, v9, v12, v14, v15, v16, age, density, LR, DA and MARS |
| Split3 | v1, v4, v5, v6, v7, v8, v10, v11, v12, v13, v16, v17, v18, density, margin, assessment, assessment, LR, DA, MARS |
| Common Selection | v4, v5, v6, v8, v16, density and MARS |

Table 10 lists the features which were selected with over 50% frequency in the experiments with different hidden units of NN using the three splits of the mass dataset. LR and MARS outputs were both highly selected features in all the experiments using three splits of the dataset.

TABLE 10

Most Frequently Selected Features in Experiments using LDM-GNN for Mass Classification

| Data set | Selected Features |
|---|---|
| Split1 | v1, v5, v6, v8, v12, v14, v15, v17, v18, margin, LR and MARS |
| Split2 | v1, v4, v5, v6, v12, v14, v15, v17, margin, LR and MARS |
| Split3 | v1, v4, v5, v6, v7, v8, v12, v16, age, margin, LR, MARS |
| Common Selection | v1, v5, v6, v12, margin, LR and MARS |

Table 11 shows the selected feature sets which produced the highest classification rates in the experiments using different splits of the calcification dataset. The most frequently selected features in the experiments for calcification classification are shown in Table 12. LR and MARS output features show the significance for calcification classification in the hybrid system.

TABLE 11

Feature Sets Selected in Experiments using LDM-GNN for Calcification Classification

| Data set | Selected Features |
|---|---|
| Split1 | v2, v5, v6, v7, v10, v11, v13, v17, age, assessment, mass_association, LR, DA and MARS |
| Split2 | v2, v3, v5, v12, v13, v17, v18, distribution, subtlety, mass_association, LR and MARS |
| Split3 | v2, v6, v9, v16, v17, density, calcification type, distribution, assessment, subtlety, mass_association, LR and MARS |
| Common Selection | v2, v17, mass_association, LR and MARS |

TABLE 12

Most Frequently Selected Features in Experiments using LDM-GNN for Calcification Classification

| Data set | Selected Features |
|---|---|
| Split1 | v1, v5, v11, v13, density, LR and MARS |
| Split2 | v1, v2, v13, v18, calcification type, distribution, LR, DA and MARS |

TABLE 12-continued

Most Frequently Selected Features in Experiments using LDM-GNN for Calcification Classification

| Data set | Selected Features |
|---|---|
| Split3 | v1, v6, v9, v13, v16, density, type, subtlety, LR and MARS |
| Common Selection | v1, v13, LR and MARS |

It will of course be realised that the above has been given only by way of illustrative example of the invention and that all such modifications and variations thereto as would be apparent to persons skilled in the art are deemed to fall within the broad scope and ambit of the invention as herein set forth.

The claims defining the invention are as follows:

1. A method for classifying tissue suspected of being abnormal in the body of a subject as being malignant or benign, comprising:
generating a set of selection features relating to data obtained about a subject which has the abnormal tissue;
performing at least three different statistical applications using the set of selection features to generate further selection features;
using the further selection features in combination with the set of selection features to generate a feature vector for the abnormal tissue;
feeding the feature vector into a neural network; and
obtaining a result from the neural network as to whether the abnormal tissue is malignant or benign.

2. The method of claim 1, wherein the data obtained about the subject is human interpreted data.

3. The method of claim 2, wherein the human interpreted data includes mass shape of the abnormal tissue.

4. The method of claim 1, wherein the data obtained about the subject is computer generated data relating to image processing features.

5. The method of claim 1, further comprising normalising the selection features prior to feeding the neural network.

6. The method of claim 1, further comprising using a genetic algorithm with the selection features prior to feeding the neural network.

7. The method of claim 1, further comprising using a genetic algorithm for teaching the neural network.

8. The method of claim 1, wherein one of the statistical applications performed is multivariate adaptive regression splines.

9. The method of claim 1, wherein one of the statistical applications performed is logistic regression.

10. The method of claim 1, wherein one of the statistical applications performed is discriminant analysis.

11. The method of claim 1, wherein the abnormal tissue is located in the breast of the subject.

12. The method of claim 1, wherein each result of each statistical application is used as one of the further selection features.

13. A method for classifying tissue suspected of being abnormal in the body of a subject as being malignant or benign, comprising:
generating a set of selection features relating to data obtained about a subject which has the abnormal tissue;
performing a statistical application utilising multivariate adaptive regression splines with the set of selection features to generate at least one further selection feature;

using the at least one further selection feature in combination with the set of selection features to generate a feature vector for the abnormal tissue;

feeding the feature vector into a neural network; and obtaining a result from the neural network as to whether the abnormal tissue is malignant or benign.

14. A method for classifying tissue suspected of being abnormal in the body of a subject as being malignant or benign, comprising:

generating a set of selection features relating to data obtained about a subject which has the abnormal tissue;

performing a statistical application utilising support vector machine with the set of selection features to generate at least one further selection feature;

using the at least one further selection feature in combination with the set of selection features to generate a feature vector for the abnormal tissue;

feeding the feature vector into a neural network; and obtaining a result from the neural network as to whether the abnormal tissue is malignant or benign.

\* \* \* \* \*